S. C. SCHOFIELD,

Assignor to E. B. WINGER & L. M. DEVOE.

Grinding-Mill.

No. 9,109. Reissued Mar. 2, 1880.

Witnesses:
C. W. Bond
H. F. Burns.

Inventor:
Silas C. Schofield
By West & Bond, Attys

N. PETERS, PHOTO-LITHOGRAPHER, WASHINGTON, D. C.

UNITED STATES PATENT OFFICE.

SILAS C. SCHOFIELD, OF FREEPORT, ILLINOIS, ASSIGNOR TO ELAM B. WINGER AND LEVI M. DEVOE, OF SAME PLACE.

GRINDING-MILL.

SPECIFICATION forming part of Reissued Letters Patent No. 9,109, dated March 2, 1880.

Original No. 199,999, dated February 5, 1878. Application for reissue filed May 2, 1879.

*To all whom it may concern:*

Be it known that I, SILAS C. SCHOFIELD, of Freeport, in the county of Stephenson and State of Illinois, have invented certain new and useful Improvements in Grinding-Mills; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
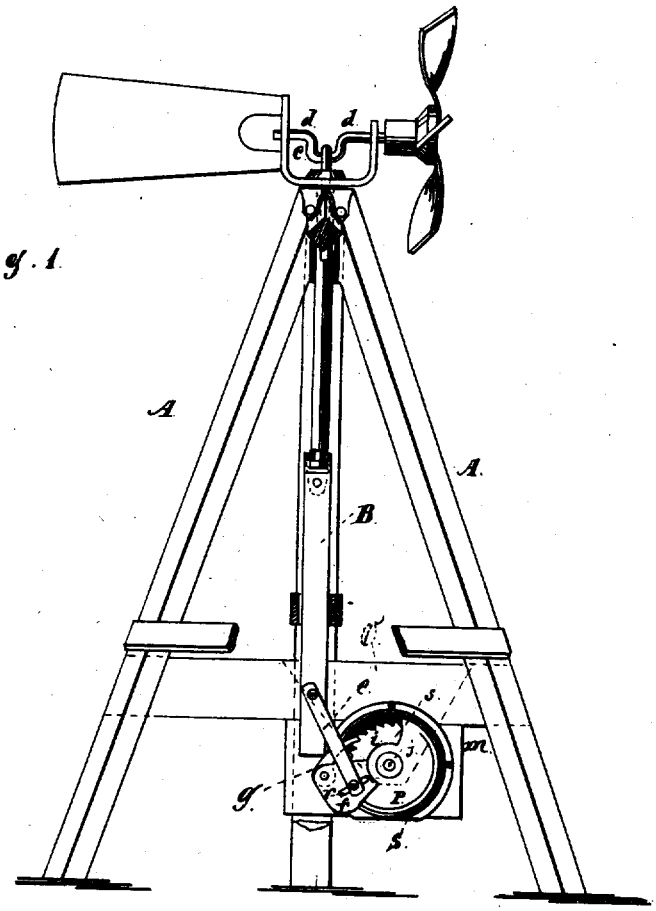
Figure 2:
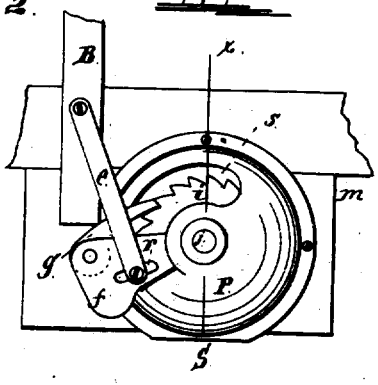
Figure 3:
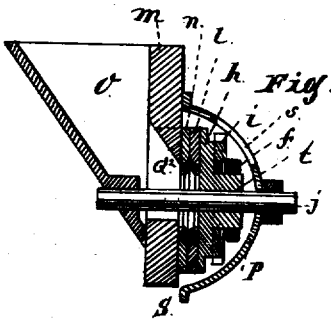

Figure 1 is a front elevation, showing my invention and representing a feed-mill arranged to be operated by a windmill. Fig. 2 is an enlarged front view of the feed-mill detached from the windmill. Fig. 3 is a vertical section taken at line *x* of Fig. 2.

The leading object of this invention is to so construct a feed-mill that it can be easily connected with and operated by the reciprocating rod of an ordinary pumping-windmill; and it consists in so constructing the feed-mill that when connected with the power the runner or movable grinding-ring will have an intermittent rotary movement, and in the devices and combinations herein claimed.

In the drawings, A represents a tower, upon which the windmill is mounted. B is the reciprocating rod, which is operated by the crank *c* in the windmill-shaft *d*. *e* is a link pivoted near the lower end of the reciprocating rod B, by means of which link the rod B is connected with a vibrating arm, *f*, which is hung loosely upon the hub *t* of the disk *h*. *g* is a pawl pivoted to the vibrating arm *f*, and so arranged as to engage with the ratchet *i*, which ratchet is fastened rigidly to the disk *h*, so that at every movement upward of the rod B the disk *h* will be moved forward.

The vibrating arm *f* is provided with a slot, *r*, which permits the lower end of the link *e* to be moved nearer to or farther from the center of motion, to increase or diminish the speed of the feed-mill, according to the power of the windmill with which it is connected.

*j* is a shaft, upon which the disk *h* is rigidly fastened. *l* is the live or moving grinding-ring, which is rigidly attached to the disk *h*. *n* is the stationary or dead grinding-ring, which is attached to the plank *m*, or other suitable stationary part. These grinding-rings are of hard metal, and similar to those used in other feed-mills.

O is the hopper, near the base of which is a bearing for one end of the shaft *j*. P is a shell or case, which incloses the principal parts of the feed-mill, in which is a bearing for the other end of the shaft *j*. In this case is an opening, *s*, through which both the arm *f* and the pawl *g* pass. Q is an aperture, through which the grain passes from the hopper and falls between the grinding-rings, and, having been ground, passes out at an opening, S.

It will be observed that, as represented, the movable grinding-ring *l* will remain stationary while the reciprocating rod B is moving downward, but will be moved forward by the action of the pawl *g* upon the ratchet *i* when the rod B moves upward, thus giving to the movable grinding-ring an intermittent rotary motion, which is desirable when the feed-mill is to be operated by a windmill.

The invention will be found very useful for farmers who desire to grind daily a limited quantity of grain for stock.

The construction is such that the feed-mill can be easily connected with or detached from the windmill.

It is obvious that it is not necessary to follow the exact construction and arrangement shown and described in order to give the grinding-ring an intermittent rotary motion through the action of a reciprocating rod of a windmill.

As described, the live grinding-ring *l*, the disk *h*, with its hub *t*, and the ratchet *i* are made separate from each other, but are so connected with each other that they all move together.

I am aware that it is not new to grind grain by wind-power, as windmills specially constructed for that purpose are very old; but my grinding-mill is adapted to be operated by windmills of small power designed for pumping, and is arranged to be attached to the pitman or pumping rod of a windmill having a cranked main shaft, or cranked wheel driven by such shaft, so that by attaching or shifting the pumping-rod to the grinding-mill an intermittent rotary movement is given to the moving grinder or runner, and as the power of the windmill is intermittently applied the grinding-mill is operated with much less power than would be required for continuous grinding, for the windmill gathers or gets momentum to be used as power while the ratchet is being returned for a new hold on the grinding-ring.

What I claim as new, and desire to secure by Letters Patent, is as follows:

1. The combination, in a grinding-mill having a fixed plate or bed-stone, the grinding-ring *l*, and a ratchet-and-pawl attachment for giving an intermittent rotary movement to the runner or ring, whereby a power which otherwise would be insufficient for grinding purposes can be utilized for grinding, substantially as specified.

2. In a grinding-mill having a fixed plate or bed-stone, the runner having ratchet-teeth, as described, in combination with a pitman and pawl, constructed and operating as described.

SILAS C. SCHOFIELD.

Witnesses:
JOHN COATES,
GEO. WOLF.